(12) United States Patent
Zhang et al.

(10) Patent No.: US 12,528,707 B2
(45) Date of Patent: Jan. 20, 2026

(54) PREPARATION METHOD OF TRICALCIUM SILICATE POWDER

(71) Applicant: Zhengzhou University of Aeronautics, Henan (CN)

(72) Inventors: Rui Zhang, Henan (CN); Li Guan, Henan (CN); Gaoyuan Wang, Henan (CN); Xinyue Zhang, Henan (CN); Hailong Wang, Henan (CN); Qiancheng Gao, Henan (CN); Mingliang Li, Henan (CN); Gaoning Cui, Henan (CN); Binbin Dong, Henan (CN); Bingbing Fan, Henan (CN)

(73) Assignee: Zhengzhou University of Aeronautics, Zhengzhou (CN)

( * ) Notice: Subject to any disclaimer, the term of this patent is extended or adjusted under 35 U.S.C. 154(b) by 482 days.

(21) Appl. No.: 18/331,180

(22) Filed: Jun. 8, 2023

(65) Prior Publication Data
US 2024/0002242 A1 Jan. 4, 2024

(30) Foreign Application Priority Data
Jul. 4, 2022 (CN) .......................... 202210780727.0

(51) Int. Cl.
*C01B 33/24* (2006.01)

(52) U.S. Cl.
CPC .......... *C01B 33/24* (2013.01); *C01P 2004/61* (2013.01)

(58) Field of Classification Search
None
See application file for complete search history.

(56) References Cited

FOREIGN PATENT DOCUMENTS

CN 110156354 A * 8/2019

* cited by examiner

*Primary Examiner* — Yun Qian

(57) ABSTRACT

Disclosed is a preparation method for tricalcium silicate powder. The method includes the following steps: taking $CaCO_3$ powder and $SiO_2$ powder as raw materials for preparation, so as to obtain mixed powder having uniform components; pre-pressing the obtained mixed powder to make a blank; and performing sintering treatment on the obtained blank at a temperature of 1,200 DEG C.-1,500 DEG C. for 0.5 h-1.5 h, so as to obtain tricalcium silicate, where the sintering treatment is to perform mixed sintering by using auxiliary heating bodies and in cooperation with microwave treatment. According to the present disclosure, the tricalcium silicate is prepared through mixed sintering by using the auxiliary heating bodies and in cooperation with the microwave treatment, and a mixed heating mechanism enables a sample to be heated more easily at a low temperature, so that synthesis purity and efficiency are improved.

9 Claims, 2 Drawing Sheets

PREPARATION METHOD OF TRICALCIUM SILICATE POWDER

TECHNICAL FIELD

The present disclosure relates to the technical field of cement infrastructure materials, in particular to a preparation method for tricalcium silicate.

BACKGROUND TECHNOLOGY

Silicate cement has been developed in the world for nearly 200 years. As an infrastructure building material required most in development of modern society, cement concrete has been widely used in civil, industrial or other infrastructure construction fields. Cement is prepared by grinding and mixing clinkers and gypsum and other mixed materials. The clinker is an important component of the cement, and a tricalcium silicate mineral is one of the most important minerals in the clinker.

Traditional preparation methods are mainly used to prepare tricalcium silicate in the prior art. Generally, CaO and $SiO_2$ are taken as raw materials for preparation and sintered at a high temperature for about 6 h, and then the temperature is kept at 1,800 DEG C. for about 1 h, so as to obtain the tricalcium silicate. The method has the disadvantages of complicated preparation procedures, high temperature requirements, high cost and serious pollution, and low purity of prepared tricalcium silicate.

Currently, in order to obtain tricalcium silicate having high purity, those skilled in the art, mainly on the basis of the traditional preparation method, calcines raw materials at a high temperature repeatedly to reduce free calcium oxide so as to improve purity. Although the purity of the tricalcium silicate can be improved to a certain extent, a preparation period is longer. In addition, problems of difficulty in preparation of high-purity tricalcium silicate, complicated procedures, high temperature requirements, high cost and serious pollution still exist.

Therefore, the present disclosure provides a preparation method for a tricalcium silicate material.

SUMMARY OF THE DISCLOSURE

In order to solve the problems in the prior art, the present disclosure provides a preparation method for tricalcium silicate.

The preparation method for tricalcium silicate of the present disclosure is implemented through the following technical solutions:

A preparation method for a tricalcium silicate material includes the following steps:
taking $CaCO_3$ powder and $SiO_2$ powder as raw materials for preparation, and performing mixing treatment to obtain mixed powder having uniform components; then pre-pressing the obtained mixed powder to make a blank, so as to obtain the blank; and performing sintering treatment on the obtained blank at a temperature of 1,200 DEG C.-1,500 DEG C. for 0.5 h-1.5 h, so as to obtain tricalcium silicate, where
the sintering treatment is to perform mixed sintering by using auxiliary heating bodies and in cooperation with microwave treatment.

Further, a molar ratio of the $CaCO_3$ powder to the $SiO_2$ powder is 2-5:1.

Further, during the sintering treatment, a wave length of the microwave treatment is 1 mm-1 m, a microwave frequency is 300 MHz-300 GHz, and microwave power is 10 w/min-60 w/min.

Further, there are several auxiliary heating bodies, and the auxiliary heating bodies are arranged around the blank material separately.

Further, the auxiliary heating body is a SiC cylinder.

Further, a heating rate of the sintering treatment is 20 DEG C./min-100 DEG C./min.

Further, a particle diameter of the mixed powder is 60 μm-100 μm.

Further, the mixing treatment is wet ball milling, and a ball-to-material ratio of the wet ball milling is 3-6:1, and a rotational speed of ball milling is 100 r/min-250 r/min.

Further, pressure of pre-pressing to make a blank is 2 MPa-5 MPa, and pressing duration is 1 min-3 min.

Compared with the prior art, the present disclosure has the following beneficial effects:

According to the present disclosure, the $CaCO_3$ powder and the $SiO_2$ powder are mixed fully and uniformly through ball milling treatment, which is conducive to full and uniform contact between the $CaCO_3$ powder and the $SiO_2$ powder in subsequent sintering processes and further obtaining of the tricalcium silicate having the uniform components.

In microwave reactions at low temperatures, the $CaCO_3$ powder and the $SiO_2$ powder can hardly be heated uniformly, so that there is almost no reaction between the raw materials for preparation. According to the present disclosure, mixed sintering is performed by using the auxiliary heating bodies and in cooperation with the microwave treatment, so that the $CaCO_3$ powder and the $SiO_2$ powder in a low temperature stage of a heating process may be heated uniformly by means of the auxiliary heating bodies in cooperation with microwaves. After the temperature rises to 800 DEG C., a sintered sample begins to be heated rapidly by relying on its own dielectric losses and microwave reactions.

Compared with traditional sintering methods, microwave sintering in the present disclosure has the advantages that microwave heating is to heat an entire material uniformly, which avoid nonuniform heating of a material surface in traditional heating, and the microwave heating features short heating duration, high efficiency, and environmental friendliness and energy saving. Moreover, according to the present disclosure, a silicon carbide (SiC) block is used as the auxiliary heating body to perform mixed sintering in cooperation with microwave sintering. A SiC auxiliary heating rod has a relatively high heat conductivity coefficient, and during the sintering, the SiC auxiliary heating rod may preferentially absorb microwaves to generate heat, and the heat is quickly and uniformly dispersed on an $Al_2O_3$ ceramic crucible. An internal heat field of the crucible is uniform, so that tricalcium silicate powder having a uniform grain size distribution may be prepared and obtained at a certain heating rate.

According to the present disclosure, the tricalcium silicate is prepared through mixed sintering by using the auxiliary heating bodies and in cooperation with the microwave treatment. Simultaneous internal and external heating of the blank may be performed for rapid sintering by using a combined action of microwaves and microwave coupled external heat sources. A mixed heating mechanism enables a sample to be heated more easily at a low temperature, and ensures that the sample is heated stably at a high temperature, so that synthesis duration of the tricalcium silicate is effectively shortened, a synthesis temperature of the tricalcium silicate is effectively reduced, and synthesis purity and efficiency are improved.

Compared with traditional industrial heating methods, the sintering treatment of the present disclosure has the advantages of realizing volumetric heating, less pollution, a shorter sintering period and lower energy consumption, etc., and a trial sintered sample may undergo internal and external heating simultaneously during the sintering, and high-purity tricalcium silicate may be obtained without repeated calcination.

DESCRIPTION OF ATTACHED DRAWINGS

SPECIFIC EMBODIMENTS

Figure 1:
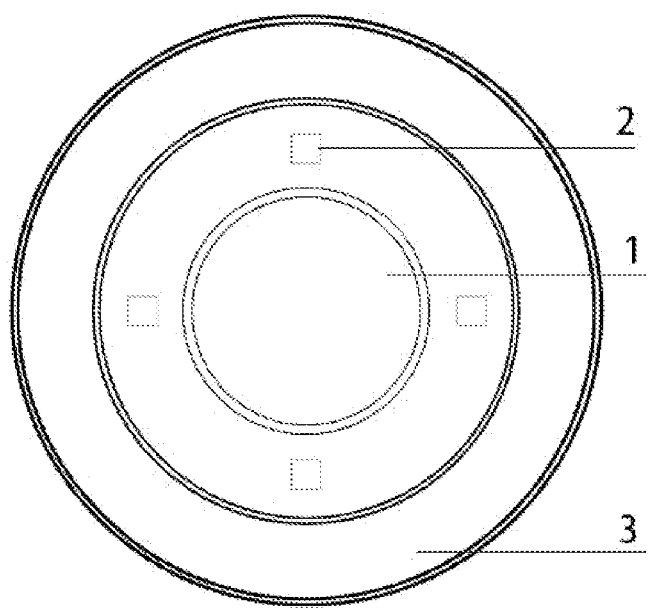
FIG. 1 is a schematic diagram of placement of a heat preservation structure and auxiliary heating bodies for microwave preparation of dicalcium silicate according to the present disclosure, where 1—crucible, 2—auxiliary heating body, and 3—heat preservation sagger.

Technical solutions in examples of the present disclosure will be clearly and completely described below with reference to the accompanying drawings in the examples of the present disclosure.

Example 1

The example improves a preparation method for a tricalcium silicate material, and the method includes the following steps:

Step 1: $CaCO_3$ powder and $SiO_2$ powder were weighed separately and mixed to obtain mixed powder having uniform components.

It should be noted that, according to the present disclosure, a specific amount relationship between the $CaCO_3$ powder and the $SiO_2$ powder is not limited, as long as a molar ratio of the $CaCO_3$ powder to the $SiO_2$ powder is within a range of 2-5:1. In the example, alternatively, a corresponding mass of the $CaCO_3$ powder and a corresponding mass of the $SiO_2$ powder are weighed separately according to the molar ratio of 3:1.

According to the present disclosure, a specific manner of mixing treatment is not limited, as long as the $CaCO_3$ powder and the $SiO_2$ powder may be uniformly mixed, and a particle diameter of the obtained mixed powder is 60 μm-100 μm. In the example, the mixing treatment is performed in a wet ball milling manner, and a ball-to-material ratio of wet ball milling in the example is 5:1, a rotational speed of ball milling is 250 r/min, and the particle diameter of the mixed powder obtained through ball milling is 60 μm-80 μm.

Step 2, the obtained mixed powder was pre-pressed to make a blank, so as to obtain the blank.

It should be noted that, according to the present disclosure, a specific mode of pre-pressing to make a blank and pressure and pressing duration during specific pressing are not limited. The pressing pressure and pressing duration need to be flexibly adjusted according to an actual amount of the mixed powder, as long as the mixed powder may be pressed into the blank having a certain fixed shape. In the example, 100 g of the mixed powder obtained through ball milling is taken and placed in a mold having a diameter Φ of 60 mm and a height of 120 mm, and is pressed at pressure of 3.5 Mpa for 1.5 min, so as to obtain the blank having a thickness of 6 mm.

Step 3, sintering treatment was performed on the obtained blank at a temperature of 1,350 DEG C. for 0.5 h to obtain tricalcium silicate, where the sintering treatment was to perform mixed sintering by using auxiliary heating bodies in cooperation with microwave treatment.

It should be noted that, according to the present disclosure, a specific material and the specific use number of the auxiliary heating bodies are not limited, as long as the blank may be heated stably and uniformly by using the auxiliary heating bodies and in cooperation with the microwave treatment. In the example, a SiC rod is used as the auxiliary heating body, and 6 SiC rods are arranged around a crucible, where the blank is placed, at equal intervals in a circumferential array, so that the blank can be heated stably and uniformly by using the auxiliary heating bodies and in cooperation with the microwave treatment.

According to the example, a type of the crucible used during the sintering treatment of the blank is not limited, as long as the blank may be uniformly heated. In the example, alternatively, an $Al_2O_3$ ceramic crucible is used for sintering.

According to the present disclosure, adjustment of the microwave treatment during the sintering treatment is not limited, as long as the blank may be uniformly heated. In the example, alternatively, a wave length of the microwave treatment is 0.5 m, a microwave frequency is 100 GHz, and microwave power is 30 w/min.

According to the present disclosure, a specific heating rate during the sintering treatment is not limited, as long as the heating rate is within a range of 20 DEG C./min-100 DEG C./min and a stable temperature rise is realized. In the example, alternatively, a heating rate of 20 DEG C./min is used to perform heating.

Example 2

The example improves a preparation method for a tricalcium silicate material, and the method includes the following steps:

Step 1: $CaCO_3$ powder and $SiO_2$ powder were weighed separately and mixed to obtain mixed powder having uniform components.

It should be noted that, according to the present disclosure, a specific amount relationship between the $CaCO_3$ powder and the $SiO_2$ powder is not limited, as long as a molar ratio of the $CaCO_3$ powder to the $SiO_2$ powder is within a range of 2-5:1. In the example, alternatively, a corresponding mass of the $CaCO_3$ powder and a corresponding mass of $SiO_2$ powder are weighed separately according to the molar ratio of 5:1.

According to the present disclosure, a specific manner of the mixed treatment is not limited, as long as the $CaCO_3$ powder and the $SiO_2$ powder may be uniformly mixed, and a particle diameter of the obtained mixed powder is 60 μm-100 μm. In the example, a wet ball milling manner is used to perform the mixing treatment, and a ball-to-material ratio of wet ball milling of the example is 5:1, a rotational speed of ball milling is 300 r/min, and a particle diameter of the mixed powder by ball milling is 80 μm-100 μm.

Step 2, the obtained mixed powder was pre-pressed to make a blank, so as to obtain the blank.

It should be noted that, according to the present disclosure, a specific mode of pre-pressing to make a blank and specific pressing pressure and pressing duration are not limited. The pressing pressure and pressing duration need to be flexibly adjusted according to an actual amount of the mixed powder, as long as the mixed powder may be pressed into the blank having a certain fixed shape. In the example, 100 g of the mixed powder obtained through ball milling is taken and placed in a mold, and is pressed at pressure of 3 MPa for 1.5 min to obtain the blank having a thickness of 8 mm.

Step 3, sintering treatment was performed on the obtained blank at a temperature of 1,400 DEG C. for 1 h to obtain tricalcium silicate, where the sintering treatment was to perform mixed sintering by using the auxiliary heating bodies in cooperation with microwave treatment.

It should be noted that, according to the present disclosure, a specific material of the auxiliary heating body is not limited, as long as the blank material is stably and uniformly heated by the auxiliary heating body in cooperation with the microwave treatment. In the example, a method as shown in FIG. 1 is used, four SiC rods are used as auxiliary heating bodies 2, and are arranged around a crucible 1, where the blank material is placed, at equal intervals according to a circumferential array, so that in cooperation with the microwave treatment, the blank material is heated stably and uniformly.

According to the example, a type of the crucible used in the sintering process of the blank material is not limited, as long as the blank material can be uniformly heated. In the example, alternatively, an $Al_2O_3$ ceramic crucible (corundum crucible) is used for sintering.

According to the present disclosure, adjustment of the microwave treatment in the sintering process is not limited, as long as the blank material can be uniformly heated. In the example, alternatively, a wave length of the microwave treatment is 0.5 m, a microwave frequency is 100 GHz, and microwave power is 30 w/min. According to the present disclosure, a specific heating rate in the sintering process is not limited, as long as it is within the range of 20 DEG C./min-100 DEG C./min and a stable temperature rise is realized. In the example, alternatively, a heating rate of 20 DEG C./min is used to carry out heating.

It should be noted that, in the sintering process, as shown in FIG. 1, a crucible 1 containing the blank material and the auxiliary heating body 2 can be placed in a heat preservation sagger 3 for sintering, and the heat preservation sagger 3 can be selected as a high-aluminum light mullite foamed brick heat preservation sagger, so that uniform sintering of the blank material is ensured, and purity of the tricalcium silicate is further improved.

Example 3

The example improves a preparation method for a tricalcium silicate material, and the method includes the following steps:

Step 1: $CaCO_3$ powder and $SiO_2$ powder were weighed separately and mixed to obtain a mixed powder having uniform components.

It should be noted that, according to the present disclosure, a specific amount relationship between the $CaCO_3$ powder and the $SiO_2$ powder is not limited, as long as a molar ratio of the $CaCO_3$ powder to the $SiO_2$ powder is within the range of 2-5:1. In the example, alternatively, corresponding masses of the $CaCO_3$ powder and the $SiO_2$ powder are weighed separately according to the molar ratio of 3:1.

According to the present disclosure, a specific manner of the mixed treatment is not limited, as long as the $CaCO_3$ powder and the $SiO_2$ powder can be uniformly mixed, and a particle diameter of the obtained mixed powder is 60 μm-100 μm. In the example, a means of wet ball milling is used to perform the mixed treatment, and a ball-to-material ratio of wet ball milling of the example is 5:1, a rotational speed of ball milling is 300 r/min, and a particle diameter of the mixed powder by ball milling is 80 μm-100 μm.

Step 2, the obtained mixed powder was pre-pressed to make a blank, so as to obtain a blank material.

It should be noted that, according to the present disclosure, a specific pre-pressed mode for preparing the blank, as well as specific pressing pressure and pressing duration are not limited. The pressing pressure and pressing duration need to be flexibly adjusted according to an actual amount of the mixed powder, as long as the mixed powder can be pressed into a blank having a certain fixed shape. In the example, 100 g of the mixed powder obtained by ball milling is taken and placed in a mold, and is pressed at a pressure of 3.5 MPa for 1.5 min to obtain the blank material having a thickness of 6 mm.

Step 3, sintering treatment was performed on the obtained blank at a temperature of 1,500 DEG C. for 0.5 h-1.5 h to obtain the tricalcium silicate, where the sintering treatment was to perform mixed sintering by using the auxiliary heating bodies and in cooperation with microwave treatment.

It should be noted that, according to the present disclosure, a specific material of the auxiliary heating body is not limited, as long as the blank is stably and uniformly heated by using the auxiliary heating bodies and in cooperation with the microwave treatment. In the example, a SiC rod is used as the auxiliary heating body, and 10 SiC rods are arranged around a crucible, where the blank is placed, at equal intervals in a circumferential array, so that the blank is stably and uniformly heated by using the auxiliary heating bodies and in cooperation with the microwave treatment.

According to the example, a type of the crucible used in the sintering process of the blank material is not limited, as long as the blank may be uniformly heated. In the example, alternatively, an $Al_2O_3$ ceramic crucible is used for sintering.

According to the present disclosure, adjustment of the microwave treatment during the sintering treatment is not limited, as long as the blank material may be uniformly heated. In the example, alternatively, a wave length of the microwave treatment is 0.5 m, a microwave frequency is 100 GHz, and microwave power is 30 w/min.

According to the present disclosure, a specific heating rate during the sintering treatment is not limited, as long as the heating rate is within a range of 20 DEG C./min-100 DEG C./min and a stable temperature rise is realized. In the example, alternatively, a heating rate of 20 DEG C./min is used to perform heating.

Example 4

The example improves a preparation method for a tricalcium silicate material, and the method includes the following steps:

Step 1: $CaCO_3$ powder and $SiO_2$ powder were weighed separately and mixed to obtain mixed powder having uniform components.

It should be noted that, according to the present disclosure, a specific amount relationship between the $CaCO_3$ powder and the $SiO_2$ powder is not limited, as long as a molar ratio of the $CaCO_3$ powder to the $SiO_2$ powder is within a range of 2-5:1. In the example, alternatively, a corresponding mass of the $CaCO_3$ powder and a corresponding mass of the $SiO_2$ powder are weighed separately according to the molar ratio of 2:1.

According to the present disclosure, a specific manner of the mixed treatment is not limited, as long as the $CaCO_3$ powder and the $SiO_2$ powder may be uniformly mixed, and a particle diameter of the obtained mixed powder is 60 μm-100 μm. In the example, a wet ball milling manner is used to perform the mixing treatment, and a ball-to-material ratio of wet ball milling of the example is 2:1, a rotational speed of ball milling is 100 r/min, and a particle diameter of the mixed powder by ball milling is 60 μm-70 μm.

Step 2, the obtained mixed powder was pre-pressed to make a blank, so as to obtain the blank.

It should be noted that, according to the present disclosure, a specific mode of pre-pressing to make a blank and specific pressing pressure and pressing duration are not limited. The pressing pressure and pressing duration need to be flexibly adjusted according to an actual amount of the mixed powder, as long as the mixed powder may be pressed into the blank having a certain fixed shape. In the example, 100 g of the mixed powder obtained through ball milling is taken and placed in a mold, and is pressed at pressure of 2 MPa for 3 min to obtain the blank.

Step 3, sintering treatment was performed on the obtained blank at a temperature of 1,200 DEG C. for 1.5 h to obtain the tricalcium silicate, where the sintering treatment was to perform mixed sintering by using the auxiliary heating bodies in cooperation with microwave treatment.

It should be noted that, according to the present disclosure, a specific material and the specific use number of the auxiliary heating bodies are not limited, as long as the blank is stably and uniformly heated by using the auxiliary heating bodies and in cooperation with the microwave treatment. In the example, a SiC rod is used as the auxiliary heating body, and 6 SiC rods are arranged around a crucible, where the blank is placed, at equal intervals in a circumferential array, so that the blank material is stably and uniformly heated by using the auxiliary heating bodies and in cooperation with the microwave treatment.

According to the example, a type of the crucible used during the sintering treatment of the blank is not limited, as long as the blank may be uniformly heated. In the example, alternatively, an $Al_2O_3$ ceramic crucible is used for sintering.

According to the present disclosure, adjustment of the microwave treatment during the sintering treatment is not limited, as long as the blank may be uniformly heated. In the example, alternatively, a wave length of the microwave treatment is 1 mm, a microwave frequency is 300 MHz, and a microwave power is 10 w/min.

According to the present disclosure, a specific heating rate during the sintering treatment is not limited, as long as the heating rate is within a range of 20 DEG C./min-100 DEG C./min and a stable temperature rise is realized. In the example, alternatively, a heating rate of 20 DEG C./min is used to perform heating.

Example 5

The example improves a preparation method for a tricalcium silicate material, and the method includes the following steps:

Step 1: $CaCO_3$ powder and $SiO_2$ powder were weighed separately and mixed to obtain mixed powder having uniform components.

It should be noted that, according to the present disclosure, a specific amount relationship between the $CaCO_3$ powder and the $SiO_2$ powder is not limited, as long as a molar ratio of the $CaCO_3$ powder to the $SiO_2$ powder is within a range of 2-5:1. In the example, alternatively, a corresponding mass of the $CaCO_3$ powder and a corresponding mass of the $SiO_2$ powder are weighed separately according to the molar ratio of 5:1.

According to the present disclosure, a specific manner of the mixing treatment is not limited, as long as the $CaCO_3$ powder and the $SiO_2$ powder may be uniformly mixed, and a particle diameter of the obtained mixed powder is 60 μm-100 μm. In the example, a wet ball milling manner is used to perform the mixing treatment, and a ball-to-material ratio of wet ball milling of the example is 6:1, a rotational speed of ball milling is 250 r/min, and a particle diameter of the mixed powder by ball milling is 90 μm-100 μm.

Step 2, obtained mixed powder was pre-pressed to make a blank, so as to obtain the blank.

It should be noted that, according to the present disclosure, a specific mode of pre-pressing to make a blank and specific pressing pressure and pressing duration are not limited. The pressing pressure and pressing duration need to be flexibly adjusted according to an actual amount of the mixed powder, as long as the mixed powder may be pressed into the blank having a certain fixed shape. In the example, 100 g of the mixed powder obtained through ball milling is taken and placed in a mold, and is pressed at pressure of 5 MPa for 1 min to obtain the blank.

Step 3, sintering treatment was performed on the obtained blank at a temperature of 1,500 DEG C. for 0.5 h to obtain the tricalcium silicate, where the sintering treatment is to perform mixed sintering by using the auxiliary heating bodies in cooperation with microwave treatment.

It should be noted that, according to the present disclosure, a specific material and the specific use number of the auxiliary heating bodies are not limited, as long as the blank is stably and uniformly heated by using the auxiliary heating bodies and in cooperation with the microwave treatment. In the example, a SiC rod is used as the auxiliary heating body, and 10 SiC rods are arranged around a crucible, where the blank is placed, at equal intervals in a circumferential array, so that the blank material is stably and uniformly heated by using the auxiliary heating bodies and in cooperation with the microwave treatment.

According to the example, a type of the crucible used during the sintering treatment of the blank is not limited, as long as the blank may be uniformly heated. In the example, alternatively, an $Al_2O_3$ ceramic crucible is used for sintering.

According to the present disclosure, adjustment of the microwave treatment during the sintering treatment is not limited, as long as the blank may be uniformly heated. In the example, alternatively, a wave length of the microwave treatment is 1 m, a microwave frequency is 300 GHz, and microwave power is 60 w/min.

According to the present disclosure, a specific heating rate during the sintering treatment is not limited, as long as the heating rate is within a range of 20 DEG C./min-100 DEG C./min and a stable temperature rise is realized. In the example, alternatively, a heating rate of 100 DEG C./min is used to perform heating.

Example 6

The example improves a preparation method for a tricalcium silicate material, and the method includes the following steps:

Step 1: $CaCO_3$ powder and $SiO_2$ powder were weighed separately and mixed to obtain mixed powder having uniform components.

It should be noted that, according to the present disclosure, a specific amount relationship between the $CaCO_3$ powder and the $SiO_2$ powder is not limited, as long as a molar ratio of the $CaCO_3$ powder to the $SiO_2$ powder is within a range of 2-5:1. In the example, alternatively, a corresponding mass of the $CaCO_3$ powder and a corresponding mass of the $SiO_2$ powder are weighed separately according to the molar ratio of 4:1.

According to the present disclosure, a specific manner of the mixing treatment is not limited, as long as the $CaCO_3$ powder and the $SiO_2$ powder may be uniformly mixed, and a particle diameter of the obtained mixed powder is 60 μm-100 μm. In the example, a wet ball milling manner is used to perform the mixing treatment, and a ball-to-material ratio of wet ball milling of the example is 4:1, a rotational speed of ball milling is 200 r/min, and a particle diameter of the mixed powder by ball milling is 80 μm-90 μm.

Step 2, obtained mixed powder was pre-pressed to make a blank, so as to obtain the blank.

It should be noted that, according to the present disclosure, a specific mode of pre-pressing to make a blank and specific pressing pressure and pressing time are not limited. The pressing pressure and pressing time need to be flexibly adjusted according to an actual amount of the mixed powder, as long as the mixed powder may be pressed into the blank having a certain fixed shape. In the example, 100 g of the mixed powder obtained through ball milling is taken and placed in a mold, and is pressed at pressure of 4 MPa for 2 min to obtain the blank.

Step 3, sintering treatment was performed on the obtained blank at a temperature of 1,350 DEG C. for 1 h to obtain tricalcium silicate, where the sintering treatment was to perform mixed sintering by using the auxiliary heating bodies in cooperation with microwave treatment.

It should be noted that, according to the present disclosure, a specific material and the specific use number of the auxiliary heating bodies are not limited, as long as the blank is stably and uniformly heated by using the auxiliary heating bodies and in cooperation with the microwave treatment. In the example, a SiC rod is used as the auxiliary heating body, and 8 SiC rods are arranged around a crucible, where the blank is placed, at equal intervals in a circumferential array, so that the blank material is stably and uniformly heated by using the auxiliary heating bodies and in cooperation with the microwave treatment.

According to the example, a type of the crucible used during the sintering treatment of the blank is not limited, as long as the blank may be uniformly heated. In the example, alternatively, an $Al_2O_3$ ceramic crucible is used for sintering.

According to the present disclosure, adjustment of the microwave treatment during the sintering treatment is not limited, as long as the blank may be uniformly heated. In the example, alternatively, a wave length of the microwave treatment is 0.5 m, a microwave frequency is 200 GHz, and microwave power is 40 w/min.

According to the present disclosure, a specific heating rate during the sintering treatment is not limited, as long as the heating rate is within a range of 20 DEG C./min-100 DEG C./min and a stable temperature rise is realized. In the example, alternatively, a heating rate of 50 DEG C./min is used to perform heating.

Contrast Example 1

The contrast example only differs from Example 1 in that: without using an auxiliary heating body in cooperation with microwave treatment, the contrast example uses a different sintering method in the prior art, that is, an alumina crucible where a blank material is placed is directly calcined in a muffle furnace at 1,200 DEG C.-1,500 DEG C.

Test Section (1) XRD Test

Figure 2:
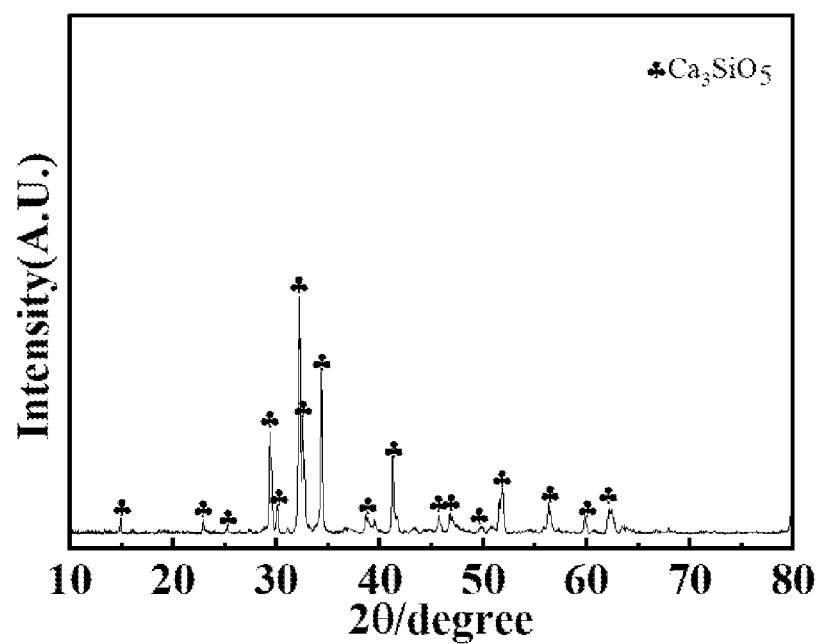
FIG. 2 is an x-ray diffraction (XRD) schematic diagram of tricalcium silicate prepared in Example 1.
Figure 3:
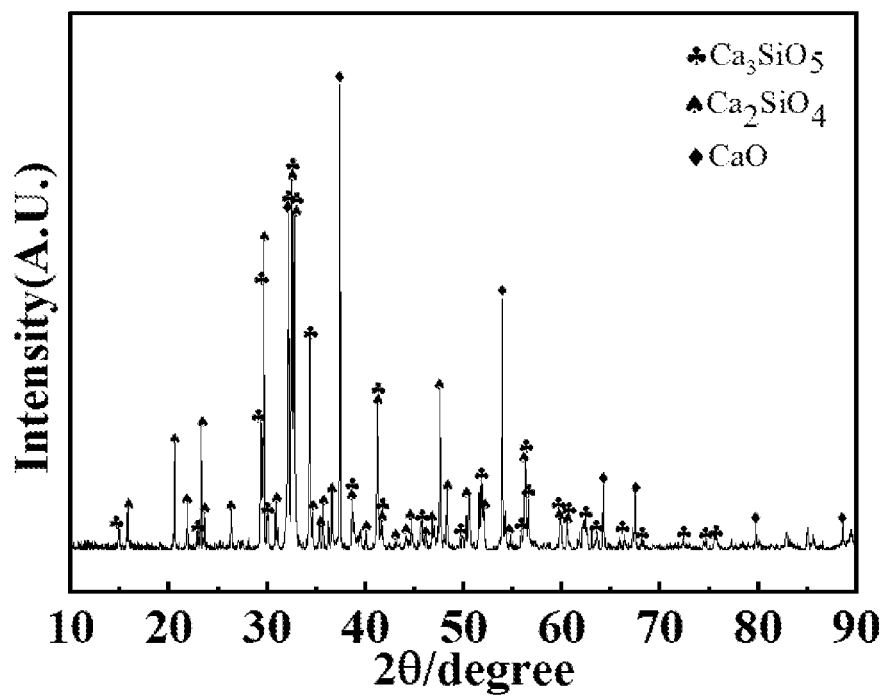
FIG. 3 is an XRD schematic diagram of tricalcium silicate prepared in Contrast Example 1.

According to the present disclosure, XRD tests were performed on tricalcium silicate prepared in Example 1 and Contrast Example 1 by using a SmartLab type x-ray diffraction (XRD) analyzer of Japan Rigaku Electric Co., Ltd., and test results were shown in FIG. 2 and FIG. 3 respectively.

It can be seen from FIG. 3 that although the tricalcium silicate ($Ca_3SiO_5$) was generated in a material prepared through a common sintering method in the prior art, dicalcium silicate ($Ca_2SiO_4$) and calcium oxide still existed, which indicated that purity of the tricalcium silicate in a prepared product was not high.

It can be seen from FIG. 2 that the tricalcium silicate ($Ca_3SiO_5$) was obviously generated in a material prepared through the method of the present disclosure, and no other obvious impure peaks appeared, which indicated that the purity of the tricalcium silicate in a product prepared by the method of the present disclosure was high. The purity was significantly improved compared with that of the preparation method in the prior art.

Figure 4:
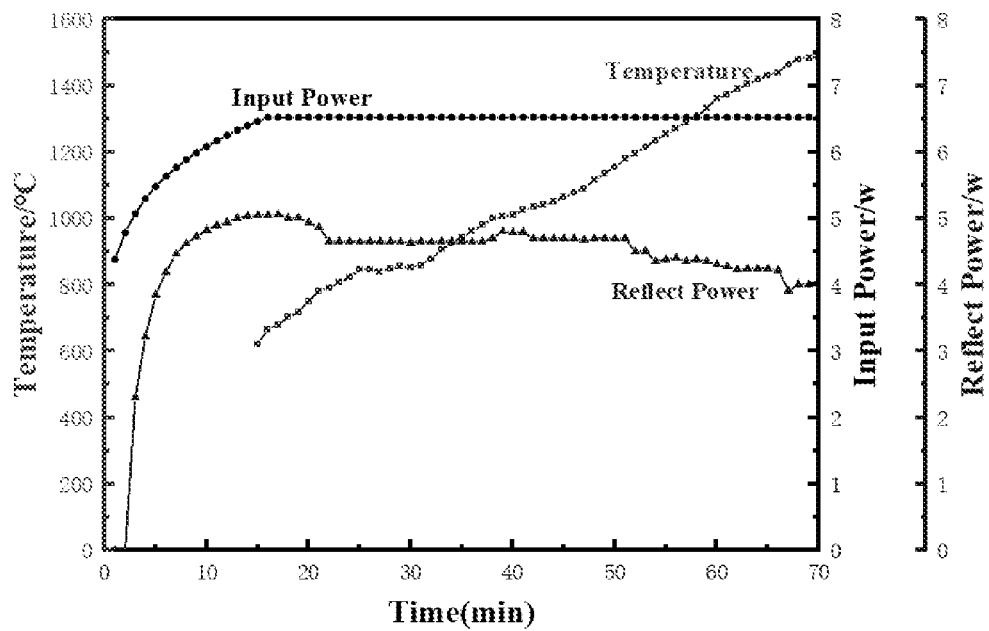
FIG. 4 is a temperature-rising curve of microwave sintering of tricalcium silicate prepared in Contrast Example 1.

In order to clarify an influence of a sintering treatment method used in the present disclosure on temperature-rising changes of a reaction system, a microwave sintering temperature-rising curve for preparing the tricalcium silicate in Example 1 of the present disclosure was tested, and results were shown in FIG. 4. A microwave oven used for sintering of the present disclosure used infrared temperature measurement, and an infrared temperature measurement device was used to perform testing according to corresponding national standards, which should be known to those skilled in the art and is not repeated in the present disclosure.

It can be seen from FIG. 4 that in Example 1, reflection power was reduced at about 800 DEG C., because the calcium silicate was already formed in a sintered sample. The calcium silicate had wave-absorbing performance, and began to react with microwaves and continued heating in this temperature interval.

The present disclosure aims to provide a preparation method for a novel silicate cement by using microwaves to sinter a tricalcium silicate mineral material. The present disclosure has the advantages that microwave sintering uses a dielectric loss of a material itself to absorb microwaves, performs volume heating, has a high synthesis speed and high synthesis efficiency, effectively reduces synthesis cost of a tricalcium silicate mineral material, and improves the synthesis efficiency.

Obviously, the examples described above are only some rather than all examples of the present disclosure. Based on the examples of the present disclosure, all other examples obtained by those ordinary skilled in the art without creative efforts fall within the scope of protection of the present disclosure.

What is claimed is:

1. A preparation method for a tricalcium silicate material, comprising the following steps:
taking $CaCO_3$ powder and $SiO_2$ powder as raw materials for preparation, and performing mixing treatment to obtain mixed powder having uniform components; then pre-pressing the obtained mixed powder to make a blank, so as to obtain the blank; and performing sintering treatment on the obtained blank at a temperature of 1,200 DEG C.-1,500 DEG C. for 0.5 h-1.5 h, so as to obtain tricalcium silicate, wherein the sintering treatment is to perform mixed sintering by using auxiliary heating bodies and in cooperation with microwave treatment.

2. The preparation method according to claim 1, wherein a molar ratio of the $CaCO_3$ powder to the $SiO_2$ powder is 2-5:1.

3. The preparation method according to claim 1, wherein during the sintering treatment, a wave length of the microwave treatment is 1 mm-1 m, a microwave frequency is 300 MHz-300 GHz, and microwave power is 10 w/min-60 w/min.

4. The preparation method according to claim 1, wherein there are several auxiliary heating bodies, and the auxiliary heating bodies are arranged around the blank material separately.

5. The preparation method according to claim 1, wherein the auxiliary heating body is a SiC cylinder.

6. The preparation method according to claim 1, wherein a heating rate of the sintering treatment is 20 DEG C./min-100 DEG C./min.

7. The preparation method according to claim 1, wherein a particle diameter of the mixed powder is 60 μm-100 μm.

8. The preparation method according to claim 1, wherein the mixing treatment is wet ball milling, and a ball-to-material ratio of the wet ball milling is 3-6:1, and a rotational speed of ball milling is 100 r/min-250 r/min.

9. The preparation method according to claim 1, wherein pressure of pre-pressing to make a blank is 2 MPa-5 MPa, and pressing duration is 1 min-3 min.

* * * * *